United States Patent
Inagaki et al.

(10) Patent No.: US 9,362,589 B2
(45) Date of Patent: Jun. 7, 2016

(54) NON-AQUEOUS ELECTROLYTE BATTERY AND BATTERY PACK

(71) Applicant: KABUSHIKI KAISHA TOSHIBA, Tokyo (JP)

(72) Inventors: Hiroki Inagaki, Kawasaki (JP); Norio Takami, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/854,628

(22) Filed: Sep. 15, 2015

(65) Prior Publication Data

US 2016/0006073 A1    Jan. 7, 2016

Related U.S. Application Data

(62) Division of application No. 12/428,131, filed on Apr. 22, 2009.

(30) Foreign Application Priority Data

Oct. 14, 2008    (JP) .................................. 2008-265401

(51) Int. Cl.
    *H01M 4/02*       (2006.01)
    *H01M 10/0525*    (2010.01)
    (Continued)

(52) U.S. Cl.
    CPC .......... *H01M 10/0525* (2013.01); *H01M 4/131* (2013.01); *H01M 4/366* (2013.01);
    (Continued)

(58) Field of Classification Search
    CPC ....................................................... H01M 4/02
    See application file for complete search history.

(56) References Cited

U.S. PATENT DOCUMENTS 4,513,167 A * 4/1985 Brandstetter ............ H01G 4/38
                                                                136/205
6,395,431 B1 * 5/2002 Gao .................. H01M 10/0525
                                                                429/326

(Continued)

FOREIGN PATENT DOCUMENTS

JP    2005-183179    7/2005
JP    2006-318797    11/2006

(Continued)

OTHER PUBLICATIONS

Office Action in corresponding Japanese Application No. 2013-253180, mailed Mar. 17, 2015. (w/English Translation).

(Continued)

*Primary Examiner* — Jacob Marks
(74) *Attorney, Agent, or Firm* — Oblon, McClelland, Maier & Neustadt, L.L.P (57) ABSTRACT

The non-aqueous electrolyte battery includes an outer case, a positive electrode housed in the outer case, a negative electrode housed in the outer case such that the negative electrode is separated from the positive electrode, and a non-aqueous electrolyte accommodated in the outer case. The negative electrode comprises a current collector and negative electrode layer formed on one surface or both surfaces of the current collector. The negative electrode layer includes at least one main negative electrode layer which is formed on the surface of the current collector and contains a first active material, and a surface layer which is formed on the surface of the main negative electrode layer and contains a second active material different from the first active material, the second active material being a lithium titanium composite oxide having a spinel structure.

8 Claims, 3 Drawing Sheets

(51) Int. Cl.
  *H01M 4/131* (2010.01)
  *H01M 4/36* (2006.01)
  *H01M 4/485* (2010.01)
  *H01M 4/48* (2010.01)

(52) U.S. Cl.
  CPC ............. *H01M 4/483* (2013.01); *H01M 4/485* (2013.01); *H01M 4/02* (2013.01); *H01M 2004/021* (2013.01); *Y02E 60/122* (2013.01); *Y02T 10/7011* (2013.01)

(56) References Cited

U.S. PATENT DOCUMENTS

| | | | |
|---|---|---|---|
| 7,629,081 B2 | 12/2009 | Inagaki et al. | |
| 8,178,244 B2 | 5/2012 | Hoshina et al. | |
| 2005/0064282 A1 | 3/2005 | Inagaki et al. | |
| 2006/0068287 A1* | 3/2006 | Morita | H01M 4/134 429/223 |
| 2006/0093904 A1* | 5/2006 | Cheon | H01M 2/0413 429/163 |
| 2007/0148545 A1* | 6/2007 | Amine | B82Y 30/00 429/231.1 |
| 2008/0169790 A1* | 7/2008 | Gozdz | H01M 4/13 320/160 |
| 2008/0238370 A1* | 10/2008 | Carrier | H01M 2/1022 320/134 |
| 2008/0311481 A1* | 12/2008 | Kim | H01M 4/13 429/342 |
| 2009/0301866 A1* | 12/2009 | Zaghib | H01M 4/0404 204/242 |
| 2010/0092846 A1 | 4/2010 | Inagaki et al. | |

FOREIGN PATENT DOCUMENTS

| | | |
|---|---|---|
| JP | 2010-97720 | 4/2010 |
| WO | WO 2007/087714 A1 | 8/2007 |

OTHER PUBLICATIONS

Office Action issued Feb. 26, 2013 in Japanese Application No. 2008-265401. (w/English Translation).

* cited by examiner

NON-AQUEOUS ELECTROLYTE BATTERY AND BATTERY PACK

CROSS-REFERENCE TO RELATED APPLICATIONS

This application is a Divisional of U.S. application Ser. No. 12/428,131 filed on Apr. 22, 2009, pending, which claims benefit to Japanese patent application No. 2008-265401, filed on Oct. 14, 2008.

BACKGROUND OF THE INVENTION

1. Field of the Invention

The present invention relates to a non-aqueous electrolyte battery and a battery pack.

2. Description of the Related Art

A non-aqueous electrolyte battery that effects charging/discharging through the movement of lithium ions between a negative electrode and a positive electrode is intensively studied and developed as a high energy density battery.

The non-aqueous electrolyte battery is demanded to have various properties depending on the end-use thereof. For example, if it is desired to be used as a power source for a digital camera, the battery is required to exhibit the discharging of about 3 C. Whereas, if it is desired to be used as a power source for vehicles such as a hybrid electric motor car, the battery is expected to require the discharging of about 10 C or more. For this reason, the non-aqueous electrolyte battery to be used for these end-uses is desired to exhibit especially large current characteristics.

In the non-aqueous electrolyte battery available in the market, lithium-transition metal composite oxides are employed as an active material of the positive electrode and carbonaceous materials are employed as an active material of the negative electrode. As for the transition metals included in the lithium-transition metal composite oxides, metals such as Co, Mn, Ni, are generally employed.

In recent years, there is concern about the degradation in safety of the non-aqueous electrolyte battery, attributable to improvements for higher output power, higher energy density and higher capacity.

With respect to the safety of the non-aqueous electrolyte, internal short-circuit caused by contamination with electroconductive foreign substances in a production process of the batteries cannot be prevented by an external circuit (protection circuit) devised to prevent over charging/over discharging. Therefore, this problem should be coped with by the battery itself.

Accordingly, JP-A 2005-183179 (KOKAI) discloses a battery wherein an inorganic insulating material layer such as an alumina layer is formed on the surface of a negative electrode containing a carbonaceous material as an active material to improve safety at the time of internal short-circuit.

In the invention disclosed in the above document, however, the inorganic insulating material layer such as an alumina layer formed on the surface of the negative electrode is highly resistive and functions as a resistance component against the negative electrode regardless of a charging/discharging state, thus degrading the large-current performance of the battery.

BRIEF SUMMARY OF THE INVENTION

According to a first aspect of the invention, there is provided a non-aqueous electrolyte battery comprising: an outer case; a positive electrode housed in the outer case; a negative electrode housed in the outer case with a space from the positive electrode; and a non-aqueous electrolyte accommodated in the outer case, wherein the negative electrode comprises a current collector and an active material-containing negative electrode layer formed on one side or both sides of the current collector, and the negative electrode layer includes at least one main negative electrode layer which is formed on the surface of the current collector and contains a first active material, and a surface layer which is formed on the surface of the main negative electrode layer and contains a second active material different from the first active material, the second active material being a lithium titanium composite oxide having a spinel structure.

According to a second aspect of the invention, there is provided a non-aqueous electrolyte battery comprising: an outer case; a positive electrode housed in the outer case; a negative electrode housed in the outer case with a space from the positive electrode; and a non-aqueous electrolyte accommodated in the outer case, wherein the negative electrode comprises a current collector and a negative electrode layer formed on one side or both sides of the current collector, the negative electrode layer includes at least one main negative electrode layer which is formed on the surface of the current collector and contains a first active material, and a surface layer which is formed on the surface of the main negative electrode layer and contains a second active material different from the first active material, the second active material absorbs and releases lithium, a volume resistivity of the second active material in a lithium-nonabsorbed state is $1 \times 10^5$ $\Omega$cm or more, and the volume resistivity of the second active material in a lithium-absorbed state is $1 \times 10^{-2}$ times or less relative to the volume resistivity thereof in a lithium-nonabsorbed state.

According to a third aspect of the invention, there is provided a battery pack including a plurality of the non-aqueous electrolyte batteries in the first aspect, wherein the batteries are electrically connected each other in series, in parallel, or in series and parallel.

DETAILED DESCRIPTION OF THE INVENTION

Hereinafter, the non-aqueous electrolyte battery and the battery pack according to the embodiment of the present invention will be explained in detail.

This non-aqueous electrolyte battery in accordance with the embodiment is equipped with an outer case. A positive electrode is housed in the outer case. A negative electrode is housed in the outer case with a space from the positive electrode, for example, with a separator being interposed between them. A non-aqueous electrolyte is accommodated in the outer case.

Now, the respective members of the non-aqueous electrolyte battery in the embodiment are described in detail.

(1) Negative Electrode

The negative electrode comprises a current collector and a negative electrode formed on one surface or both surfaces of the current collector and containing an active material. The negative electrode layer is a laminate of a plurality of layers containing different active materials. That is, the negative electrode layer has a multilayer structure including at least one main negative electrode layer which is formed on the surface of the current collector and contains a first active material, and a surface layer which is formed on the surface of the main negative electrode layer and contains a second active material different from the first active material. The second active material absorbs and releases lithium. The volume resistivity of the second active material is $1 \times 10^5$ Ωcm or more in a lithium-nonabsorbed state, and the volume resistivity of the second active material in a lithium-absorbed state is $1 \times 10^{-2}$ times or less relative to the volume resistivity thereof in a lithium-nonabsorbed state. The volume resistivity of the second active material in a lithium-absorbed state is more preferably $1 \times 10^{-4}$ times or less relative to the volume resistivity of the second active material in a lithium-nonabsorbed state.

The phrase "a volume resistivity of the second active material in a lithium-nonabsorbed state" refers to the volume resistivity inherent in the second active material into which lithium is not absorbed.

When the non-aqueous electrolyte battery including a negative electrode having a surface layer containing a second active material having the property described above is charged and discharged for the initial time, the second active material may, even after discharge to 0V, have lithium remaining therein. That is, when a negative electrode having a surface layer containing the second active material having the property described above is integrated in a battery and then charged and discharged for the initial time, the second active material comes to have lithium substantially absorbed therein, so that when the second active material removed from the surface layer after discharge to 0V is measured for its volume resistivity, the resistivity is a value lower than the volume resistivity of the second active material in a lithium-nonabsorbed state. It follows that when the battery after discharge to 0V is dismantled and the second active material is removed from the surface layer of the negative electrode and subjected to inactivation treatment, then the volume resistivity of the second active material in a lithium-nonabsorbed state can be measured.

The volume resistivity of the second active material can be measured in the following manner.

Plate-shaped lower and upper steel electrodes each having, in the center of one side thereof, a vertically protruding cylindrical body having an outer diameter of 1 inch, and an insulating tube made of a vinyl chloride resin having an inner diameter of 1 inch, are prepared respectively. The total length of the cylindrical bodies of the lower and upper electrodes is the same as the length of the insulating tube.

On a plate-shaped insulating sheet of 2 mm in thickness consisting of polytetrafluoroethylene, the lower electrode is placed such that its cylindrical body protrudes upward. The insulating tube is connected to the cylindrical body of the lower electrode so that the bottom of the insulating tube is positioned on the upper surface of the cylindrical body. 5 g of a sample weighed out with an even balance is filled in the insulating tube. The cylindrical body of the upper electrode is inserted into the opening at the upper end of the insulating tube. A plate-shaped insulating sheet consisting of polytetrafluoroethylene is placed on the upper surface of the upper electrode. Using a hydraulic press machine, load is applied to the plate-shaped insulating sheet at the upper side, so that the sample in the insulating tube is pressed with the cylindrical body of the upper electrode inserted into the insulating tube. The load with the hydraulic press machine is set at 10 kg/cm² on a hydraulic gauge scale. An LCR meter (resistance meter) (trade name: AR-480D manufactured by Keisei Corporation) is connected to the lower and upper electrodes under pressure at 10 kg/cm², and immediately after connection, the resistance r (Ω) is read. The thickness (cm) of the sample pressed in the insulating tube is measured, and the volume resistivity (Ωcm) of the sample is then calculated. An equation for calculating the volume resistivity is as follows:

Volume resistivity (Ωcm)=$\{(2.54/2)^2 \times \pi\} \times (r/L)$ wherein r is the resistance immediately after connection, and L is the thickness of the sample after filled and pressed in the insulating tube.

Besides the LCR meter (trade name: AR-480D manufactured by Keisei Corporation), a resistance meter having equivalent or better performance may also be used.

When the negative electrode including a surface layer containing a second active material having such property generates internal short-circuit in the positive electrode/negative electrode-opposed region, the second active material serving as a short-circuit part in the surface layer shows insulation properties, thus making the passage of a large current difficult. As a result, the battery can be prevented from generating heat, and safety can be improved.

That is, the surface layer of the negative electrode layer in the negative electrode contains a second active material having a volume resistivity of $1 \times 10^5$ Ωcm or more in a lithium-nonabsorbed state, and the volume resistivity of the second active material in a lithium-absorbed state is $1 \times 10^{-2}$ times or less relative to the volume resistivity thereof in a lithium-nonabsorbed state. In Other words, this second active material in the lithium-nonabsorbed state has a volume resistivity of $1 \times 10^5$ Ωcm or more, and substantially shows insulation properties. The second active material in the lithium-absorbed state has the volume resistivity of $1 \times 10^{-2}$ times or less relative to the volume resistivity thereof in the lithium-nonabsorbed state, and shows relatively good conductive property. When the non-aqueous electrolyte battery including a negative electrode having such a surface layer generates internal short-circuit, for example due to foreign substance present in the positive electrode/negative electrode opposed region, the foreign substance is contacted with the surface layer of the negative electrode. The contact of the foreign substance with the surface layer and the generation of internal short-circuit lead to rapid discharge in the part of contact of the second active material in the surface layer with the foreign substance, to bring about a lithium-unabsorbed state of the second active material. Accordingly, the surface layer containing the second active material positioned in the short-circuit part where the second active material is contacted with the foreign substance comes to have a volume resistivity of $1 \times 10^5$ Ωcm or more, and substantially shows insulation properties. As a result, the passage of a current via the foreign substance between the positive electrode and the negative electrode is limited by the second active material showing insulation properties, thus making the passage of a large current difficult. Consequently, the battery can be prevented from generating heat and safety can be improved.

A lithium titanium composite oxide having a spinel structure for example can be used as the second active material contained in the surface layer. When this lithium titanium composite oxide is used, its inhibitory action on passage of a current via foreign substance between the positive electrode and the negative electrode is specifically described.

The lithium titanium composite oxide having a spinel structure (for example, $Li_4Ti_5O_{12}$) has a lithium working electric potential of about 1.55V (vs. Li/Li⁺), and absorbs and releases lithium upon battery charging/discharging as shown in the following formula 1:

(1)

In formula 1, the rightward arrow shows charging, and the leftward arrow shows discharging.

As shown in formula 1, $Li_4Ti_5O_{12}$ in a lithium-unabsorbed state has a volume resistivity of about $1\times10^6$ Ωcm and substantially shows insulation properties. On the other hand, the lithium titanium composite oxide in a lithium-absorbed state has a volume resistivity of about $1\times10^1$ to $1\times10^2$ Ωcm, that is, about $1\times10^{-4}$ to $1\times10^{-5}$ times relative to that of $Li_4Ti_5O_{12}$, and shows conductive property.

When the non-aqueous electrolyte battery including a negative electrode having a surface layer containing such a lithium titanium composite oxide generates internal short-circuit for example due to foreign substance present in the positive electrode/negative electrode-opposed region, the foreign substance is contacted with the surface layer of the negative electrode. The contact of the foreign substance with the surface layer and the generation of internal short-circuit lead to rapid discharge in the part of contact, with the foreign substance, of the lithium titanium composite oxide having a spinel structure in the surface layer, to bring about a lithium-unabsorbed state of the lithium titanium composite oxide. Accordingly, the surface layer containing the lithium titanium composite oxide having a spinel structure positioned in the short-circuit part where the composite oxide is contacted with the foreign substance comes to have a volume resistivity of about $1\times10^6$ Ωcm, and substantially shows insulation properties. As a result, the passage of a current via the foreign substance between the positive electrode and the negative electrode is limited by the surface layer containing the lithium titanium composite oxide showing insulation properties, thus making the passage of a large current difficult. As a result, the battery can be prevented from generating heat and safety can be improved.

The second active material with the above property (for example, the lithium titanium composite oxide having a spinel structure) contained in the surface layer of the negative electrode effects usual charging/discharging by absorption and release of lithium, except upon internal short-circuit accompanying its contact with foreign substance or the like, that is, except while in a lithium-unabsorbed state occurring in the part of contact with foreign substance or the like to increase the volume resistivity. That is, the second active material has absorbed lithium therein, and shows relatively good conductive property as compared with the second active material in a lithium-unabsorbed state. As a result, the surface layer of the negative electrode layer in a usually charged/discharged state, unlike a conventional inorganic insulating material layer (for example, an alumina layer), does not function as a resistance component against the negative electrode, and can thus maintain large current performance.

The second active material contained in the surface layer of the negative electrode layer, for example the lithium titanium composite oxide having a spinel structure, is preferably $Li_{4+x}Ti_5O_{12}$ (−1≤x≤3), from the viewpoint of the reversibility of charging/discharging (charge/discharge cycle performance). Although the molar ratio of lithium titanium composite oxide is formally represented by 12 in the spinel type $Li_{4+x}Ti_5O_{12}$ (−1≤x≤3), these values may fluctuate depending on the influence of oxygen nonstoichiometry. Even if inevitable impurities are contained, the effect of the present invention is not lost.

The average thickness of the surface layer is preferably 3 µm to 30 µm. The average thickness of the surface layer can be measured by the following method. The concentration distribution of a main component of the second active material contained in the surface layer is measured at a plurality of points (arbitrary 5 points or more) on a section of the surface layer of the negative electrode. For example, with SEM-EDX or the like, a line profile of titanium is observed in the direction of lamination of the layer, and its flexion point is assumed to be in the interface between the surface layer and the main negative electrode layer, to determine the thickness of the surface layer. When the second active material contained in the surface layer is a lithium titanium composite oxide having a spinel structure, the concentration distribution of titanium or oxygen can be measured to determine the thickness of the surface layer.

When the thickness of the surface layer is less than 3 µm, it becomes difficult to exhibit an excellent current blocking effect during internal short-circuit attributable to foreign substance. When the thickness of the surface layer is more than 30 µm, the proportion of the surface layer in the negative electrode layer is increased, that is, the proportion of the main negative electrode layer is decreased, resulting sometimes in hindrance to achieve a higher capacity/higher energy density of the battery. That is, when the second active material is a lithium titanium composite oxide having a spinel structure, its theoretical electric capacity is 175 mAh/g. When the electric capacity of the second active material contained in the main negative electrode layer is higher than that of the spinel-type lithium titanium composite oxide, an increase in the thickness of the surface layer containing the spinel-type lithium titanium composite oxide hinders achievement of a higher capacity/higher energy density of the battery.

The surface layer containing the second active material having a property of drastically changing its volume resistivity with change between a lithium-unabsorbed state and a lithium-absorbed state, for example, the lithium titanium composite oxide having a spinel structure, includes (1) a layer consisting exclusively of the lithium titanium composite oxide, (2) a layer consisting of a mixture of the lithium titanium composite oxide and a binder, and (3) a layer consisting of a mixture of the lithium titanium composite oxide, a conductive material, and a binder.

The surface layer of the lithium titanium composite oxide having a spinel structure as described in item 1, above, can be formed by, for example, a dry coating method such as CVD or sputtering. The surface layer containing the lithium titanium composite oxide having a spinel structure as described in items 2 and 3, above, can be prepared for example by dispersing the lithium titanium composite oxide having a spinel structure, together with the binder or the binder and the conductive material, in a solvent such as N-methylpyrrolidone (NMP) to prepare slurry, and then applying and drying the slurry. This coating method can form a thick film industrially in a short time.

The binder contained in the surface layers described in items 2 and 3, above, includes, for example, polytetrafluoroethylene (PTFE), polyvinylidene fluoride (PVdF), fluorine-based rubber, styrene butadiene rubber, a core-shell binder, or the like. The binder is compounded in an amount of preferably 15% by weight or less, more preferably 6% by weight or less, based on the weight of the active material in the surface layer.

The conductive material contained in the surface layer described in item 3, above, includes, for example, carbon materials such as acetylene black, carbon black, cokes, carbon fibers or graphite, electroconductive ceramic powder such as powder of titanium nitride or titanium oxide, and metal powder such as aluminum powder. The conductive material is compounded in an amount of preferably 15% by weight or less, more preferably 6% by weight or less, based on the weight of the active material in the surface layer.

The main negative electrode layer in the negative electrode layer has a structure of one or more layers each containing a first active material different from the second active material in the surface layer.

The lithium absorption-release potential of the first active material contained in the main negative electrode layer is preferably lower than 3V (vs. Li/Li$^+$). When the lithium absorption-release potential is higher than 3V (vs. Li/Li$^+$), the voltage of the battery may be decreased to lower the energy density of the battery. From this viewpoint, the first active material is selected preferably from carbonaceous materials, lithium titanium composite oxides (excluding those having a spinel structure), lithium molybdenum composite oxides, or lithium niobium composite oxides.

On the other hand, the lithium absorption-release potential of the first active material is preferably higher than 1.0V (vs. Li/Li$^+$). The lithium absorption-release potential of the second active material (for example, the lithium titanium composite oxide having a spinel structure) contained in the surface layer is 1.55V (vs. Li/Li$^+$). When the lithium absorption-release potential of the first active material is made higher than 1.0V (vs. Li/Li$^+$), the difference of the lithium absorption-release potential thereof from that of the lithium titanium composite oxide is decreased so that the reversibility of charging/discharging in the surface layer can be improved. From this viewpoint, the first active material contained in the main negative electrode layer is selected preferably from lithium titanium composite oxides (excluding those having a spinel structure), lithium molybdenum composite oxides, or lithium niobium composite oxides.

From the viewpoint of the reversibility of charging/discharging (charge/discharge cycle characteristics), the first active material is selected preferably from lithium titanium composite oxides having a ramsdellite structure, an anatase structure, a rutile structure, a brookite structure or a bronze structure.

The lithium titanium composite oxide contained in the main negative electrode layer includes, for example, titanium oxides (for example, TiO$_2$) having an anatase structure, a rutile structure, a brookite structure or a bronze structure, titanium oxides (for example, Li$_{2+y}$Ti$_3$O$_7$ [0≤y≤3]) having a ramsdellite structure, or those titanium oxides obtained by substituting a part of their structural elements with other element(s). Examples of the titanium oxides include TiO$_2$ or titanium-containing metal composite oxides containing Ti and at least one element selected from the group consisting of P, V, Sn, Cu, Ni, Fe and Co (for example, TiO$_2$—P$_2$O$_5$, TiO$_2$—V$_2$O$_5$, TiO$_2$—P$_2$O$_5$—SnO$_2$ and TiO$_2$—P$_2$O$_5$-MeO wherein Me is at least one element selected from the group consisting of Cu, Ni, Fe and Co). Such titanium-containing metal composite oxides preferably have a microstructure in which a crystal phase and an amorphous phase coexist or a single phase formed of an amorphous phase exists. The titanium-containing metal composite oxides having such a microstructure can attain a substantially high capacity even upon high-rate charging/discharging and can outstandingly improve the cycle performance.

The lithium absorption-release potential of any of such titanium oxides is 1 to 2V (vs. Li/Li$^+$).

Molybdenum oxides can be exemplified by Li$_x$MoO$_2$ (1 to 2V [vs. Li/Li$^+$]) or Li$_x$MoO$_3$ (1 to 3V [vs. Li/Li$^+$]). Niobium oxides can be exemplified by Li$_x$Nb$_2$O$_5$ (1 to 3V [vs. Li/Li$^+$]). Their lithium absorption-release potentials are as shown in parentheses.

The first active material contained in the main negative electrode layer is preferably the titanium oxide having a ramsdellite structure or a bronze structure, which is excellent particularly in charging/discharging reversibility (charge/discharge cycle characteristics). The first active material is most preferably the bronze-type titanium oxide having a largest electric capacity.

The first active material contained in the main negative electrode layer is desirably a particle having an average particle size of 3 μm or less, preferably 1 μm or less, and having a specific surface area in the range of 5 to 50 m$^2$/g as determined by a BET method by N$_2$ adsorption. The first active material particle having such average particle size and specific surface area can improve their capacity factor and attain a substantially high capacity even upon high-rate charging/discharging. The BET specific surface area by N$_2$ adsorption can be determined, for example, with Micromeritex ASAP-2010 (manufactured by Shimadzu Corporation) using N$_2$ as absorption gas.

Generally, as the average particle size of the first active material particle is decreased that is, as the specific surface area of the active material particles is increased, a battery made more excellent in large-current performance (output performance) is obtained, while a current passing therethough upon internal short-circuit is increased thus significantly reducing the safety of the battery. The non-aqueous electrolyte battery in accordance with the embodiment of the invention forms a surface layer containing a specific second active material in the main negative electrode layer as described above, thereby bringing about an effect of suppressing internal short-circuit, and therefore, when the main negative electrode layer contains the first active material having a small average particle size and a large specific surface area, the battery can simultaneously achieve large current performance (output performance) and high safety.

The main negative electrode layer contains a conductive material and a binder. As the conductive material, a carbon material for example can be used. Examples of the carbon material include acetylene black, carbon black, cokes, carbon fibers and graphite. Other examples include metal powder such as aluminum powder and electroconductive ceramics such as TiO. Particularly, cokes having an average particle size of 10 μm or less obtained by heat treatment at 800 to 2000° C., graphite, and carbon fibers having an average particle size of 1 μm or less are preferable. The BET specific surface area of the carbon material by N$_2$ adsorption is preferably not lower than 10 m$^2$/g. Examples of the binder include polytetrafluoroethylene (PTFE), polyvinylidene fluoride (PVdF), fluorine-based rubber, styrene-butadiene rubber, and a core-shell binder.

Each proportion of the first active material, conductive material and binder to be compounded in the main negative electrode layer is preferably in the following range: the first active material being 70% by weight or more and 96% by weight or less, the conductive material being 2% by weight or more and 28% by weight or less, and the binder being 2% by weight or more and 28% by weight or less. When the amount of the conductive material is less than 2% by weight, there is a fear that the current collective ability of the main negative electrode layer is degraded and therefore, the large current performance of the non-aqueous electrolyte battery is degraded. Also, when the amount of the binder is less than 2% by weight, the binding ability between the main negative electrode layer and the current collector is degraded and there is therefore a possibility that the cycle performance is degraded. On the other hand, each of the conductive material and the binder is preferably 28% by weight or less from the viewpoint of obtaining a high capacity.

The porosity of the main negative electrode layer is preferably in the range of 20 to 50% by volume. The negative electrode including the main negative electrode layer of such porosity is made highly dense and is excellent in affinity for the non-aqueous electrolyte. The porosity is more preferably in the range of 25 to 40% by volume.

A copper foil, a nickel foil, a stainless steel foil, an aluminum foil or an aluminum alloy foil can be used as the current collector. When the lithium absorption-release potential of the active material contained in the main negative electrode layer is 1V (vs. Li/Li$^+$), an aluminum foil or an aluminum alloy foil is preferably used from the viewpoint of lightweight and the over-discharge resistance of the battery.

Preferably, the aluminum foil or aluminum alloy foil (current collector) has an average crystal grain size of 50 μm or less. Such a current collector can drastically increase strength so that the negative electrode can be made highly dense by high pressing pressure. As a result, the battery capacity can be increased. Since the current collector can also be prevented from undergoing dissolution and corrosion degradation in an over discharge cycle under a high temperature (40° C. or more) environment, it is possible to suppress the elevation in the impedance of the negative electrode. Further, it is possible to improve the output performance, the rapid charging performance, and the charge/discharge cycle performance of the battery. The average crystal grain size of the current collector is more preferably 30 μm or less, even more preferably 5 μm or less.

The average crystal grain size can be determined in the following manner. The texture of the current collector surface is observed with an electron microscope to determine the number (n) of crystal grains present within an area of 1 mm×1 mm. Then, the average crystal grain area (S) is obtained from the equation: $S=1\times10^6/n$ [μm$^2$] wherein n denotes the number of crystal grains noted above. Further, the average crystal grain size (d [μm]) is calculated from the obtained area S by the following equation I:

$$d=2(S/\pi)^{1/2} \quad (I)$$

The aluminum foil or the aluminum alloy foil having an average crystal grain size of 50 μm or less can be complicatedly affected by many factors such as the composition of the material, impurities, process conditions, history of the heat treatments and annealing conditions, and the crystal grain size can be adjusted by an appropriate combination of the factors noted above during the manufacturing process.

The aluminum foil or the aluminum alloy foil has a thickness of preferably 20 μm or less, more preferably 15 μm or less. The aluminum foil preferably has a purity of 99% by weight or more. The aluminum alloy is preferably an alloy containing another element such as magnesium, zinc or silicon. On the other hand, the amount of the transition metal such as iron, copper, nickel and chromium in the aluminum alloy is preferably 1% by weight or less.

The negative electrode is manufactured by suspending, for example, an active material, a conductive material and a binder in a widely used solvent to prepare slurry, applying the slurry onto a current collector, drying it to form a main negative electrode layer, and then forming a surface layer on the main negative electrode layer by the method described above, followed by pressing the resultant layer. Alternatively, the main negative electrode layer may be prepared by forming an active material, a conductive material and a binder in the form of pellets and then forming them on the surface of a current collector.

(2) Outer Case

The outer case is formed of a laminate film having a thickness of 0.5 mm or less or a metallic vessel having a thickness of 1.0 mm or less. The thickness of the metallic vessel is more preferably 0.5 mm or less.

The configuration of the outer case may be a flattened (thin-type), a square type, a cylindrical type, a coin type or a button type. These outer cases may be variously designed depending on the size thereof. For example, it can be designed as an outer case for a small battery which can be mounted, for example, on mobile electronic instruments, or as an outer case for a large battery which can be mounted, for example, on a motor vehicle such as a two-wheeled vehicle or a four-wheeled vehicle.

The laminate film can make use of a multi-layer film having a metal layer interposed between resin layers. The metal layer is formed preferably of aluminum foil or aluminum alloy foil for reducing the weight thereof. Examples of the resin layers include polymer materials such as polypropylene (PP), polyethylene (PE), nylon, or polyethylene terephthalate (PET). The laminate film can be molded into any desired configuration of outer case through sealing using thermal fuse-bonding.

The metal vessel is made of aluminum or aluminum alloys. The aluminum alloys preferably those containing an element such as magnesium, zinc, or silicon. If aluminum alloys containing a transition metal such as iron, copper, nickel or chromium are to be employed, the amount of the transition metal is confined preferably to 100 ppm or less by weight.

(3) Positive Electrode

The positive electrode comprises a current collector and a positive electrode layer formed on one surface or both surfaces of the current collector and containing an active material, a conductive material and a binder.

Preferably the current collector is for example an aluminum foil or an aluminum alloy foil containing an element such as Mg, Ti, Zn, Mn, Fe, Cu or Si.

The active material which can be used includes, for example, oxides, polymers.

The oxides which can be used include, for example, oxides having lithium absorbed therein, such as manganese dioxide ($MnO_2$), iron oxide, copper oxide or nickel oxide as well as lithium manganese composite oxides (for example, $Li_xMn_2O_4$ or $Li_xMnO_2$), lithium nickel composite oxides (for example, $Li_xNiO_2$), lithium cobalt composite oxides (for example, $Li_xCoO_2$), lithium nickel cobalt composite oxides (for example, $LiNi_{1-y}Co_yO_2$), lithium manganese cobalt composite oxides (for example, $Li_xMn_yCo_{1-y}O_2$), spinel type lithium manganese nickel composite oxides (for example, $Li_xMn_{2-y}Ni_yO_4$), lithium phosphorus oxide of olivine structure (for example, $Li_xFePO_4$, $Li_xFe_{1-y}Mn_yPO_4$, $Li_xCoPO_4$), iron sulfate ($Fe_2(SO_4)_3$), or vanadium oxide (for example, $V_2O_5$). Herein, x and y are preferably confined to $0 \leq x \leq 1$ and $0 \leq y \leq 1$, respectively.

The polymers can be use, for example, conductive polymer materials such as polyaniline or polypyrrole, as well as disulfide-based polymer materials. It is also possible to use sulfur (S), carbon fluoride.

Preferable examples of the active materials include those exhibiting a higher positive electrode voltage, such as lithium manganese composite oxides ($Li_xMn_2O_4$), lithium nickel composite oxides ($Li_xNiO_2$), lithium cobalt composite oxides ($Li_xCoO_2$), lithium nickel cobalt composite oxides ($Li_xNi_{1-y}Co_yO_2$), spinel type lithium manganese nickel composite oxides ($Li_xMn_{2-y}Ni_yO_4$), lithium manganese cobalt composite oxides ($Li_xMn_yCo_{1-y}O_2$), or lithium iron phosphate ($Li_xFePO_4$). Herein, x and y are preferably confined to $0 \le x \le 1$ and $0 \le y \le 1$, respectively.

Most preferable examples of the active materials include lithium cobalt composite oxides or lithium manganese composite oxides. These composite oxides are characterized by high ionic conductivity, so that when they are used in combination with the negative-electrode active materials in the embodiment of the invention, the diffusion of lithium ions in the active materials can hardly serve as a rate determining step. For this reason, these composite oxides are excellent in compatibility with the lithium titanium composite oxides (excluding those having a spinel structure) that are the active material in the main negative electrode in the embodiment.

Preferably, the primary particle size of the active material is confined to 100 nm or more and 1 μm or less. By doing so, the handling of the active material would become easier in the industrial production, and the inter-solid diffusion of lithium ions can proceed smoothly.

Preferably, the specific surface area of the active material is confined to 0.1 to 10 $m^2$/g. By doing so, it becomes possible to sufficiently secure the absorption/release site of lithium ions and the handling thereof would become easier in the industrial production, and it is possible to secure excellent charge/discharge cycle performance.

The conductive material can use, for example, carbonaceous materials such as acetylene black, carbon black, or graphite. These conductive materials are useful in enhancing the electronic collecting performance and for suppressing the contact resistance of the active material to the current collector.

The binder for binding the active material to the conductive material can use, for example, polytetrafluoroethylene (PTFE), polyvinylidene fluoride (PVdF), or fluorine-based rubber.

The mixing ratio among the active material, the conductive material and the binder is preferably 80 to 95% by weight of the active material, 3 to 18% by weight of the conductive material, and 2 to 17% by weight of the binder. When the mixing ratio of the conductive material is not less than 3% by weight, it is possible to exhibit the aforementioned effects. When the mixing ratio of the conductive material is confined to 10% by weight or less, it is possible to minimize the decomposition of non-aqueous electrolyte on the surface of the conductive material even in high-temperature storage. When the binder is incorporated at a mixing ratio of not less than 2% by weight, it is possible to secure a sufficient strength of the electrode. When the mixing ratio of the binder is confined to 10% by weight or less, it is possible to decrease the mixing ratio of the insulating material of the electrode and to decrease the internal resistance of the electrode.

The positive electrode is manufactured for example by suspending the active material, the conductive material and the binder in a suitable solvent to prepare slurry, then applying the slurry onto the surface of a current collector and drying it to form a positive electrode layer, followed by pressing the resultant layer. Alternatively, a mixture consisting of an active material, a conductive material and a binder may be formed into pellets and used to form the positive electrode layer.

(4) Non-Aqueous Electrolyte

Examples of the non-aqueous electrolyte include a liquid-form non-aqueous electrolyte prepared by dissolving an electrolyte in an organic solvent, or a gel-form non-aqueous electrolyte prepared by compounding the liquid-form non-aqueous electrolyte and a polymer material.

The liquid-form non-aqueous electrolyte is prepared by dissolving an electrolyte in a concentration of 0.5 to 2.5 mol/L in an organic solvent.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and bistrifluoromethylsulfonylimide lithium ($LiN(CF_3SO_2)_2$), or mixtures of these compounds. Those which are scarcely oxidized at a high potential are preferable and $LiPF_6$ is most preferable.

Examples of the organic solvent that can be used include single or mixed solvents of cyclic carbonates such as propylene carbonate (PC), ethylene carbonate (EC) or vinylene carbonate; linear carbonates such as diethyl carbonate (DEC), dimethyl carbonate (DMC) or methyl ethyl carbonate (MEC); cyclic ethers such as tetrahydrofuran (THF), 2-methyltetrahydrofuran (2MeTHF) or dioxolan (DOX); linear ethers such as dimethoxyethane (DME) or diethoxyethane (DEE); γ-butyrolactone (GBL); acetonitrile (AN); or sulfolane (SL).

Examples of the polymer material may include polyvinylidene fluoride (PVdF), polyacrylonitrile (PAN) or polyethylene oxide (PEO).

The organic solvent is preferably a mixed solvent containing two or more kinds of solvents selected from the group consisting of propylene carbonate (PC), ethylene carbonate (EC) and γ-butyrolactone (GBL). More preferable organic solvent is γ-butyrolactone (GBL). The reason for this is as follows.

The lithium composite oxide of titanium, molybdenum or niobium performs absorption-release of lithium ions in the potential range of about 1 to 3V (vs. $Li/Li^+$). However, reductional decomposition of a non-aqueous electrolyte hardly occurs in this potential range, and a coating that is a reduced product of a non-aqueous electrolyte is less likely to be formed on the surface of the lithium titanium composite oxide. For these reasons, when the lithium titanium composite oxide is preserved in a lithium-absorbed state i.e. in a charged state, the lithium ions absorbed into the lithium titanium composite oxide gradually diffuse into the electrolyte, whereupon so-called self-discharge is induced. Self-discharge noticeably takes place when an environment where the battery is stored becomes hot.

Among the aforementioned organic solvents, the γ-butyrolactone is more liable to reduction as compared with linear carbonates or cyclic carbonates.

Specifically, the order of liability to reduction is: γ-butyrolactone>>>ethylene carbonate>propylene carbonate>>dimethyl carbonate>methylethyl carbonate>diethyl carbonate. Therefore, when this γ-butyrolactone is incorporated into an electrolyte, it becomes possible to form an excellent film on the surface of the lithium titanium composite oxide even at the working potential range of the lithium titanium composite oxide. As a result, it is possible to suppress the self-discharging and to enhance the high-temperature storage characteristics of the non-aqueous electrolyte battery.

Even in the case of the aforementioned mixed solvent including two or more solvents selected from the group consisting of propylene carbonate (PC), ethylene carbonate (EC) and γ-butyrolactone (GBL) or especially in the case of a mixed solvent containing γ-butyrolactone, it is possible to suppress the self-discharging likewise and to enhance the high-temperature storage characteristics of the non-aqueous electrolyte battery.

γ-Butyrolactone is preferable because it can form an excellent protective film by incorporating it in an amount of 40 to 95% by volume based on the organic solvent.

(5) Separator

Examples of the separator include a porous film formed of polyethylene, polypropylene, cellulose or polyvinylidene fluoride (PVdF), and unwoven fabrics formed of synthetic resin. Among them, a porous film formed of polyethylene or polypropylene is preferable, since it is capable of being fused at a predetermined temperature, thereby cutting of electric current. Thus, this porous film is preferable from the viewpoint of enhancing the safety.

Figure 1:
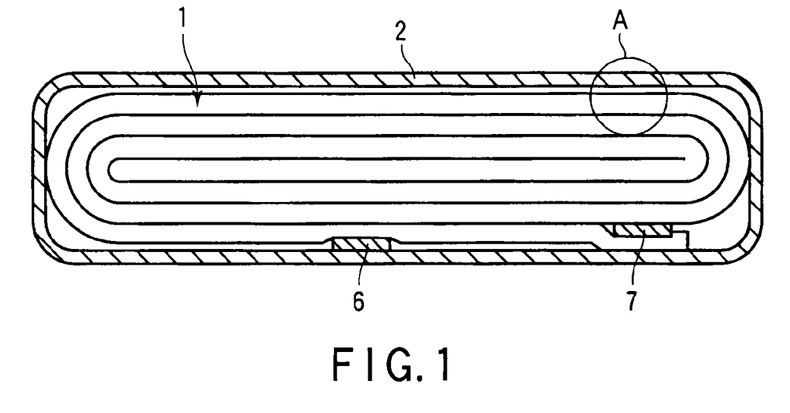
FIG. 1 is a sectional view of a flattened non-aqueous electrolyte battery according to an embodiment.
Figure 2:
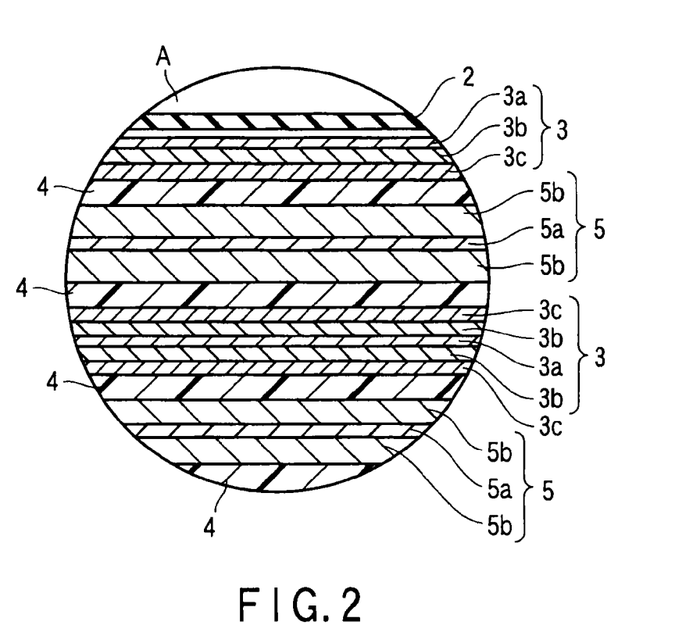
FIG. 2 is an enlarged sectional view of part A in FIG. 1.

Next, the non-aqueous electrolyte battery (a flattened non-aqueous electrolyte battery where the outer case is formed of a laminate film) according to the embodiment of the invention will be explained with reference to FIGS. 1 and 2. FIG. 1 is a cross-sectional view illustrating a flattened non-aqueous electrolyte battery and FIG. 2 is an enlarged cross-sectional view of part A in FIG. 1. These figures are schematically illustrated for the purpose of explanation and for facilitating the understanding of the present invention, so that the configuration, dimension and dimensional ratio thereof may differ from those of the actual device. These features and design can be optionally modified by referring to the following description and the technologies known in the art.

A flattened wound electrode group 1 is housed in a bag-like outer case 2 which is formed from a laminate film including a couple of resin layers with aluminum foil interposed between them. The flattened wound electrode group 1 is constructed by spirally wounding and press-molding a laminate including mentioning from outside, a negative electrode 3, a separator 4, a positive electrode 5 and a separator 4. As shown in FIG. 2, the negative electrode 3 constituting the outermost husk is composed of a current collector 3a, a main negative electrode layer 3b formed on one side of the current collector 3a, and a surface layer 3c formed on the main negative electrode layer 3b. The other negative electrode 3 is composed of a current collector 3a, a main negative electrode layer 3b and a surface layer 3c formed respectively on both sides of the current collector 3a. The surface layer 3c contains the specific second active material described above, for example, the spinel type lithium titanium composite oxide. The main negative electrode layer 3b contains a first active material different from the spinel type lithium titanium composite oxide, for example, selected from carbonaceous materials, lithium titanium composite oxides (excluding those having a spinel structure), lithium molybdenum composite oxides, and lithium niobium composite oxides. The positive electrode 5 is constructed such that a positive electrode layer 5b is formed on both sides of a positive electrode current collector 5a.

In the vicinity of the outer circumferential edge portion of the wound electrode group 1, a negative electrode terminal 6 is electrically connected to the current collector 3a of the negative electrode 3 constituting the outermost husk, and a positive electrode terminal 7 is electrically connected to the positive electrode collector 5a of the inner positive electrode 5. The negative electrode terminal 6 and positive electrode terminal 7 are led out through an opening of the bag-like outer case 2. For example, a liquid non-aqueous electrolyte is poured into the bag-like outer case 2 through the opening of the outer case 2. The opening of the bag-like outer case 2 is heat-sealed with the negative electrode terminal 6 and positive electrode terminal 7 being located inside, thereby completely sealing the wound electrode group 1 and the liquid non-aqueous electrolyte.

The negative terminal can make use of electrically conductive materials having electric stability and conductive property under the condition where the electric potential thereof to lithium ion metal is in the range of 1.0 to 3.0V. Examples of the material for the negative terminal include aluminum and aluminum alloys containing elements such as Mg, Ti, Zn, Mn, Fe, Cu, and Si. Preferably, the negative terminal is formed of the same material as that of the current collector of the negative electrode in order to minimize the contact resistance thereof to the current collector of the negative electrode.

The positive terminal can make use of electrically conductive materials having electric stability and conductive property under the condition where the electric potential thereof to lithium ion metal is in the range of 3.0 to 4.25V. Examples of the material for the positive terminal include aluminum and aluminum alloys containing elements such as Mg, Ti, Zn, Mn, Fe, Cu, and Si. Preferably, the positive terminal is formed of the same material as that of the current collector of the positive electrode in order to minimize the contact resistance thereof to the current collector of the positive electrode.

According to the non-aqueous electrolyte battery in accordance with such embodiments, the surface layer in the negative electrode contains a second active material (for example, a lithium titanium composite oxide having a spinel structure) that absorbs and releases lithium and has a volume resistivity of $1 \times 10^5$ Ωcm or more in a lithium-nonabsorbed state, and the volume resistivity of the second active material in a lithium-absorbed state is $1 \times 10^{-2}$ times or less relative to the volume resistivity thereof in a lithium-nonabsorbed state, thereby improving safety at the time of internal short-circuit without reducing large current performance, owing to the action described above.

Now, the battery pack according to the embodiment of the invention is described in detail.

The battery pack according to the embodiment is provided with a plurality of the aforementioned non-aqueous electrolyte batteries (single cells) which are electrically connected to one another in series, in parallel, or in series and parallel.

In the battery pack according to the embodiment, a plurality of the aforementioned non-aqueous electrolyte batteries with improvement in safety upon internal short-circuit are formed as single cells into an assembled battery, so that high safety can be maintained.

The battery pack in accordance with the embodiment will be explained in detail with reference to FIGS. 3 and 4. The single cell can make use of the flattened battery shown in FIG. 1.

A plurality of single cells 21 each being formed of the flattened non-aqueous electrolyte battery shown in FIG. 1 are laminated such that the negative electrode terminal 6 and the positive electrode terminal 7, both being externally led out, are arrayed to extend in the same direction, and the single cells are clamped together by means of an adhesive tape 22, thereby creating a assembled battery 23. These single cells 21 are electrically connected to one another in series as shown in FIG. 4.

A printed wiring board 24 is disposed to face the side wall of each of the single cells 21 where the negative electrode terminal 6 and the positive electrode terminal 7 are externally led out. On this printed wiring board 24 are mounted a thermistor 25, a protection circuit 26, and a terminal 27 for electrically connecting the printed wiring board 24 to external instruments. It should be noted that in order to prevent unwanted electric connection to the wirings of the assembled battery 23, an insulating plate (not shown) is attached to the surface of the protection circuit board 26 that faces the assembled battery 23.

A lead 28 for the positive electrode is electrically connected, through one end thereof, to the positive electrode terminal 7 which is located at the lowest layer of the assembled battery 23. The other end of the lead 28 is inserted into, and electrically connected to, a connector 29 for the positive terminal of the printed wiring board 24. A lead 30 for the negative electrode is electrically connected, through one end thereof, to the negative electrode terminal 6 which is located at the highest layer of the assembled battery 23. The other end of the lead 30 is inserted into, and electrically connected to, a connector 31 for the negative terminal of the printed wiring board 24. These connectors 29 and 31 are electrically connected, through interconnects 32 and 33 formed on the printed wiring board 24, to the protection circuit 26.

The thermistor 25 is used for detecting the temperature of single cells 21 and the signals thus detected are transmitted to the protection circuit 26. The protection circuit 26 is designed to cut off, under prescribed conditions, a wiring 34a of plus-side and a wiring 34b of minus-side which are interposed between the protection circuit 26 and the terminal 27 for electrically connecting the printed wiring board 24 to external instruments. The expression "under prescribed conditions" herein means the conditions under which the temperature detected by the thermistor 25 becomes higher than a predetermined temperature for example. Further, the expression "under prescribed conditions" herein also means the conditions under which the over-charging, over-discharging and over-current of the single cells 21 are detected. This over-charging is detected for the single cells 21 individually or entirely. In the case where the single cells 21 are to be detected individually, either the voltage of the cell may be detected or the potential of the positive or negative electrode may be detected. In the latter case, a lithium electrode is inserted, as a reference electrode, into individual cells 21. In the case of the battery pack shown in FIGS. 3 and 4, a wiring 35 is connected to each of the single cells 21 for detecting the voltage thereof, and the signals detected are transmitted, through this wiring 35, to the protection circuit 26.

On all of the sidewalls of the assembled battery 23 excluding one sidewall where the positive electrode terminal 7 and the negative electrode terminal 6 are protruded, a protective sheet 36 made of rubber or synthetic resin is disposed respectively.

The assembled battery 23 is housed, together with protective sheets 36 and the printed wiring board 24, in a case 37. Namely, the protective sheets 36 are disposed respectively on the opposite inner sidewalls constituting the longer sides of the case 37 and on one inner sidewall constituting one shorter side of the case 37. The printed wiring board 24 is disposed on the other sidewall constituting the other shorter side of the case 37. The assembled battery 23 is positioned in a space surrounded by the protective sheets 36 and the printed wiring board 24. A lid 38 is attached to the top of the case 37.

A thermally shrinkable tube may be used in place of the adhesive tape 22 in order to fix the assembled battery 23. In this case, the protective sheet is disposed on the opposite sidewalls of the assembled battery and then the thermally shrinkable tube is disposed to surround these protective sheets, after which the thermally shrinkable tube is allowed to thermally shrink, thereby fastening the assembled battery.

Figure 3:
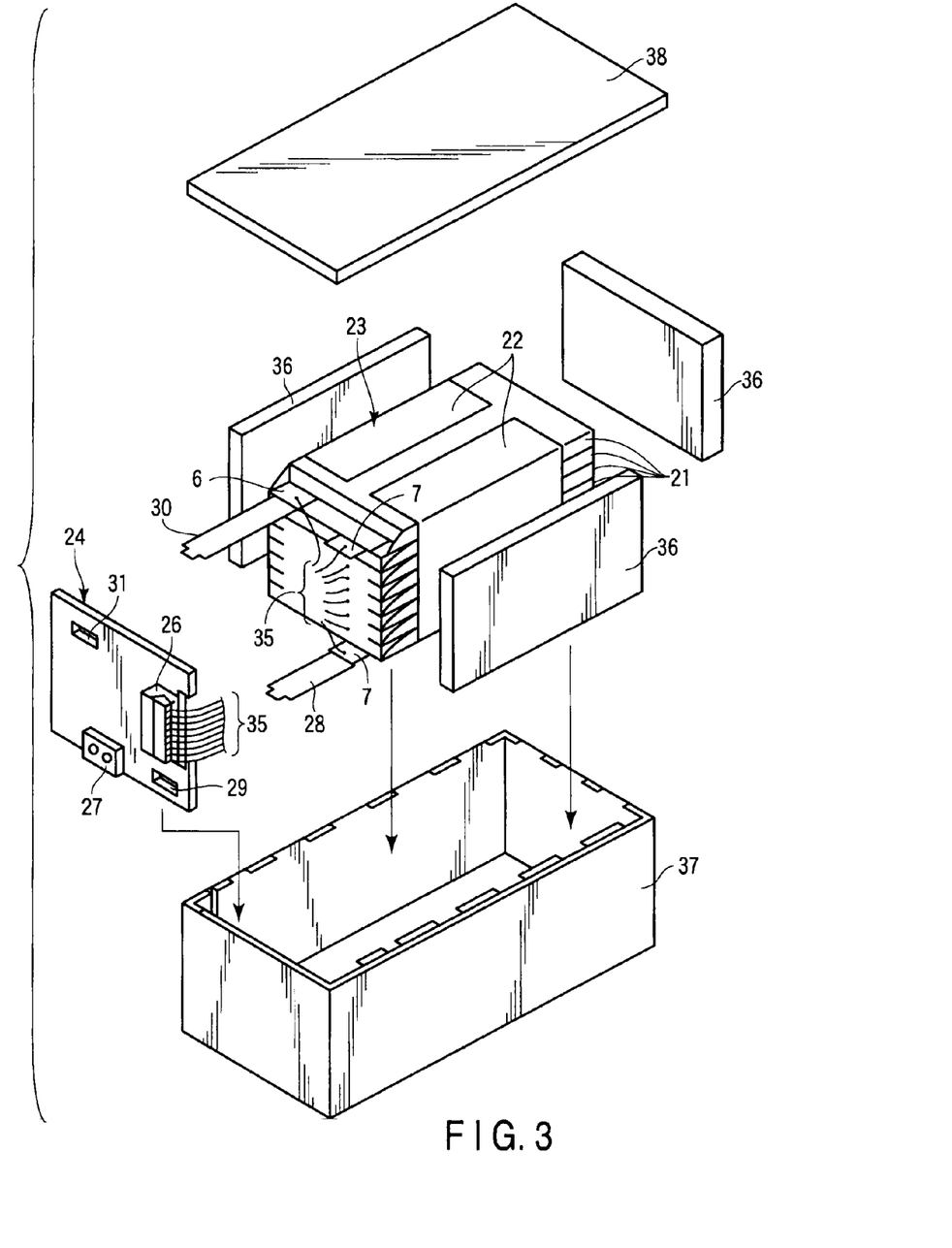
FIG. 3 is an exploded perspective view of a battery pack according to the embodiment.
Figure 4:
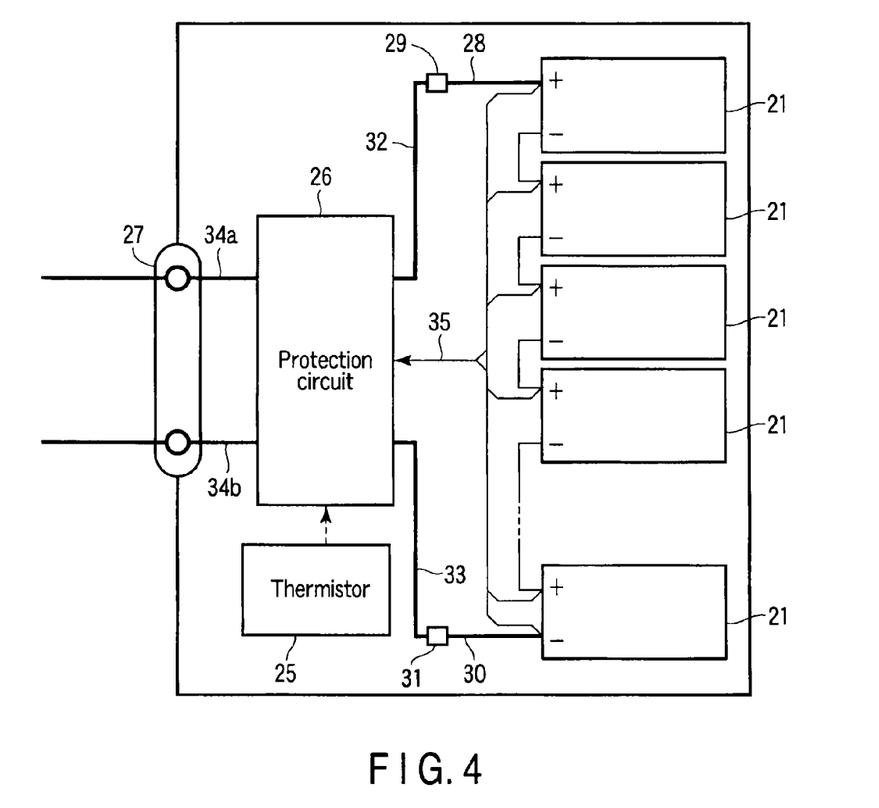
FIG. 4 is a block diagram of the battery pack in FIG. 3.

In the embodiment shown in FIGS. 3 and 4, the single cells 21 are electrically connected to one another in series. However, the single cells may be electrically connected to one another in parallel or both in series and in parallel in order to increase the capacity of the battery. A plurality of battery packs, each being assembled as described above, may further be electrically connected to one another in series or in parallel.

Further, the embodiment of the battery pack may be optionally modified depending on the end-use thereof. As for the end-use of the battery pack, it can be preferably applied to those where excellent cycle characteristics are desired in large current performance. Specifically, the battery pack can be employed as a power source for digital cameras or as an on-vehicle type power source for two-wheeled or four-wheeled hybrid electric vehicles, for two-wheeled or four-wheeled electric vehicles, or for electrically assisted bicycles. The battery pack is particularly suited for use as an on-vehicle type power source.

As described above, the non-aqueous electrolyte containing a mixed solvent including two or more kinds of solvents selected from the group consisting of propylene carbonate (PC), ethylene carbonate (EC) and γ-butyrolactone (GBL), or the non-aqueous electrolyte containing γ-butyrolactone (GBL), can be used to obtain a non-aqueous electrolyte battery excellent in high-temperature characteristics. A battery pack provided with a assembled battery consisting of a plurality of non-aqueous electrolyte batteries each constructed as described above is especially suited for use as an on-vehicle type power source.

Hereinafter, examples of the present invention will be explained. However, the following examples are not intended to limit the scope of the invention unless the gist of the invention is exceeded.

Example 1

Preparation of Positive Electrode

First, 90% by weight of lithium manganese oxide ($LiMn_{1.9}Al_{0.1}O_4$) powder having a spinel structure as an active material, 5% by weight of acetylene black as a conductive material, and 5% by weight of polyvinylidene fluoride (PVdF) were added to and mixed with N-methylpyrrolidone (NMP) to prepare slurry. This slurry was then applied onto both surfaces of a current collector made of an aluminum foil having a thickness of 15 μm, then dried and pressed to prepare a positive electrode having an electrode density of 2.9 g/cm³.
<First Active Material in Negative Electrode>

As the first active material, a mesophase pitch based carbon fiber heat-treated at 3,000° C. (fiber diameter, 8 μm; average fiber length, 20 μm; average spacing [$d_{002}$], 0.3360 nm) was used.
<Synthesis of Second Active Material in Negative Electrode>

$Li_2CO_3$ and anatase-type $TiO_2$ were mixed at a Li/Ti molar ratio of 4/5 and then baked at 850° C. for 12 hours in the atmosphere and then ground to yield a spinel-type lithium titanium composite oxide ($Li_4Ti_5O_{12}$) particle having an average particle size of 0.8 μm as a second active material.

The average particle size of the spinel-type lithium titanium composite oxide particle was measured by the following method using a laser diffraction type distribution measuring instrument (SALD-300 manufactured by Shimadzu Corporation). First, about 0.1 g of active material sample, surface active agent, and 1 to 2 mL of distilled water were added in a beaker, and stirred and mixed sufficiently. This mixed solution was then poured into an agitating water tank, and the luminous intensity distribution was measured 64 times at intervals of 2 seconds to numerically analyze the particle size distribution data, thereby determining the average particle size of the spinel-type lithium titanium composite oxide.
<Preparation of Negative Electrode>

95% by weight of the first active material and 5% by weight of polyvinylidene fluoride (PVdF) were added to and mixed with N-methylpyrrolidone (NMP) to prepare slurry. This slurry was then applied onto both sides of a current collector made of a copper foil having a thickness of 12 μm, and then dried to prepare a main negative electrode layer. Then, 90% by weight of the second active material, 5% by weight of acetylene black as a conductive material, and 5% by weight of polyvinylidene fluoride (PVdF) were added to and mixed with N-methylpyrrolidone (NMP) to prepare slurry. This slurry was then applied onto the surface of the main negative electrode layer and then dried to form a surface layer. Thereafter, it was pressed to manufacture a negative electrode having an electrode density of 1.7 g/cm$^3$.

The surface layer and main negative electrode layer of the resulting negative electrode were cut respectively, and with SEM-EDX, the resulting sections were measured for their Ti concentration in a direction perpendicular to the current collector. As a result, the average thickness of the surface layer was about 10 μm. It was also confirmed that the surface layer is present in uniform thickness over substantially the whole area of the main negative electrode layer. The average thickness of the main negative electrode layer was 30 μm.

<Preparation of Electrode Group>

The positive electrode, a separator made of a porous polyethylene film having a thickness of 25 μm, the negative electrode, and another separator were laminated in the mentioned order to form a flattened electrode group. The resulting electrode group was housed in a pack made of an aluminum laminate film and then vacuum dried at 80° C. for 24 hours.

<Preparation of Liquid Non-Aqueous Electrolyte>

LiBF$_4$ was dissolved as an electrolyte to a concentration of 1.5 mol/L in a mixed solvent consisting of ethylene carbonate (EC) and γ-butyrolactone (GBL) at a volume ratio of 1/2, to prepare a liquid non-aqueous electrolyte.

The liquid non-aqueous electrolyte was injected into the laminate film pack in which the electrode group had been housed, and the pack was completely sealed by heat-sealing, to produce a non-aqueous electrolyte secondary battery with the structure shown in FIG. 1, having a width of 70 mm, a thickness of 6.5 mm, a height of 120 mm and a capacity of 3 Ah.

Comparative Example 1

A non-aqueous electrolyte secondary battery was produced in the same manner as in Example 1 except that a negative electrode having a main negative electrode layer only formed on a current collector was used.

Comparative Example 2

A non-aqueous electrolyte secondary battery was produced in the same manner as in Example 1 except that an alumina layer of 10 μm in thickness consisting of alumina (Al$_2$O$_3$) having an average particle size of 0.1 μm was formed in place of the surface layer containing the second active material.

Comparative Example 3

A non-aqueous electrolyte secondary battery was produced in the same manner as in Example 1 except that a surface layer containing titania (rutile-type TiO$_2$) having an average particle size of 0.1 μm in place of the second active material was formed on a main negative electrode layer.

The batteries in Example 1 and Comparative Examples 1 to 3 were evaluated for their load characteristics at 1 C and 30 C. Thereafter, each battery was charged to 4.4V and then crushed with round bar having diameter of 1 cm, and the surface temperature of the battery was measured. The test was carried out twice using different batteries. The results are shown in Table 1.

TABLE 1

|  | Load characteristic (30 C/1 C capacity ratio) | Maximum temperature of battery (first time) | Maximum temperature of battery (second time) |
| --- | --- | --- | --- |
| Example 1 | 80% | 91° C. | 97° C. |
| Comparative Example 1 | 80% | 253° C. | 298° C. |
| Comparative Example 2 | 50% | 168° C. | 187° C. |
| Comparative Example 3 | 50% | 171° C. | 188° C. |

As shown in Table 1 above, the battery in Example 1 showed minimum heat generation and was thus confirmed to have high safety. The load characteristics in Example 1, wherein a spinel-type lithium titanium oxide was contained in a surface layer, were equivalent to those in Comparative Example 1 wherein a surface layer-free negative electrode having a main negative electrode layer only formed on a current collector was used.

On the other hand, the battery in Comparative Example 2 wherein an alumina layer was formed on a main negative electrode layer, and the battery in Comparative Example 3 wherein a titania-containing surface layer was formed on a main negative electrode layer, showed significantly reduced load characteristics as compared with those in Example 1 and Comparative Example 1.

Example 2

The positive and negative electrodes prepared in Example 1 were opposed to each other via a separator provided with an 18 mm square internal short-circuit area to prepare a single layer battery.

Comparative Example 4

The positive and negative electrodes prepared in Comparative Example 1 were opposed to each other via a separator provided with an 18 mm square internal short-circuit area to prepare a single layer battery.

Examples 3 to 8

Single layer batteries were prepared in the same manner as in Example 2 except that the first active material contained in the main negative electrode layer was changed to the materials shown in Table 2 below.

Comparative Examples 5 to 8

Single layer batteries were prepared in the same manner as in Comparative Example 4 except that the first active material contained in the main negative electrode layer was changed to the materials shown in Table 2 below.

The internal short-circuit area of each of the single layer batteries obtained in Examples 2 to 8 and Comparative Examples 4 to 8 was pressed at a pressure of about 7 N/cm$^2$, during which a change in voltage was monitored. The time elapsed until the voltage of each battery arrived at 1V is shown in Table 2.

TABLE 2

| | Main negative electrode layer | | | | |
|---|---|---|---|---|---|
| | First active material | Particle size (μm) | Specific surface area (m²/g) | Thickness of surface layer (μm) | Arrival time (min) |
| Comparative Example 4 | Carbon fiber | 8 | 1 | None | 0.2 |
| Example 2 | Carbon fiber | 8 | 1 | 10 | 100 |
| Example 3 | Carbon fiber | 8 | 1 | 1 | 90 |
| Example 4 | Carbon fiber | 8 | 1 | 3 | 100 |
| Comparative Example 5 | TiO$_2$ (bronze type) | 0.6 | 20 | None | <3 |
| Example 5 | TiO$_2$ (bronze type) | 0.6 | 20 | 10 | >100 |
| Comparative Example 6 | Li$_2$Ti$_3$O$_7$ | 0.8 | 10 | None | <3 |
| Example 6 | Li$_2$Ti$_3$O$_7$ | 0.8 | 10 | 10 | >100 |
| Comparative Example 7 | Li$_x$MoO$_2$ | 3 | 5 | None | <3 |
| Example 7 | Li$_x$MoO$_2$ | 3 | 5 | 10 | >100 |
| Comparative Example 8 | Li$_x$Nb$_2$O$_5$ | 3 | 5 | None | <3 |
| Example 8 | Li$_x$Nb$_2$O$_5$ | 3 | 5 | 10 | >100 |

As is evident from Table 2, it can be seen that upon internal short-circuit, the voltage reduction of the batteries in Examples 2 to 8 is slower than in the batteries in Comparative Examples 4 to 8. This is considered due to the fact that the spinel-type lithium titanium composite oxide that is the second active material contained in the surface layer suppresses the flow of internal short-circuit current.

Accordingly, the batteries in Examples 2 to 8 are low in heat generation upon internal short-circuit and can secure high safety.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-aqueous electrolyte battery, comprising:
   an outer case;
   a positive electrode housed in the outer case;
   a negative electrode housed in the outer case with a space from the positive electrode; and
   a non-aqueous electrolyte accommodated in the outer case, wherein
   the negative electrode comprises a current collector and a negative electrode layer formed on one surface or both surfaces of the current collector, and
   the negative electrode layer comprises:
      at least one main negative electrode layer which is formed on the surface of the current collector and comprises a mixture of a first active material and a binder,
      wherein the first active material is selected from lithium titanium composite oxides, lithium molybdenum composite oxides, or lithium niobium composite oxides, and
      a surface layer which is formed on the surface of the main negative electrode layer,
      wherein the surface layer comprises a mixture of a second active material, which is different from the first active material, and binder,
      wherein a volume resistivity of the second active material in a lithium-nonabsorbed state is $1 \times 10^5$ Ω cm or more,
      wherein the volume resistivity of the second active material in a lithium-absorbed state is $1 \times 10^{-2}$ times or less relative to the volume resistivity thereof in a lithium-nonabsorbed state, and
      wherein the surface layer excludes the first active material in the main negative electrode layer.

2. The battery of claim 1, wherein the specific surface area of the first active material is not less than 5 m²/g.

3. The battery of claim 1, wherein the first active material is a particle having an average particle size of 0.1 to 3 μm.

4. The battery of claim 1, wherein the surface layer has an average thickness of 3 to 30 μm.

5. The battery of claim 1, wherein the surface layer further comprises a conductive material.

6. The battery of claim 1, the capacity of the battery is 3 Ah or more.

7. A battery pack comprising a plurality of the non-aqueous electrolyte batteries of claim 1, which are electrically connected each other in series, in parallel, or in series and parallel.

8. The battery pack of claim 7, which further comprises a protection circuit capable of detecting the voltage of the batteries.

* * * * *